(12) United States Patent
Yu et al.

(10) Patent No.: US 11,610,290 B2
(45) Date of Patent: Mar. 21, 2023

(54) POINT SOURCE DETECTION

(71) Applicant: Rockwell Collins, Inc., Cedar Rapids, IA (US)

(72) Inventors: Ming Yu, Beaverton, OR (US); Christopher A. Keith, Wilsonville, OR (US); Gary B. Kingsley, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 809 days.

(21) Appl. No.: 16/580,858

(22) Filed: Sep. 24, 2019

(65) Prior Publication Data
US 2021/0088774 A1    Mar. 25, 2021

(51) Int. Cl.
G06T 5/00       (2006.01)
H04N 5/225      (2006.01)
(Continued)

(52) U.S. Cl.
CPC ............... G06T 5/006 (2013.01); B64D 45/08 (2013.01); G06T 5/008 (2013.01); G06V 10/30 (2022.01);
(Continued)

(58) Field of Classification Search
CPC ......... G06T 5/006; G06T 5/008; B64D 45/08; G06V 10/30; G06V 30/164; H04N 5/2259;
(Continued)

(56) References Cited

U.S. PATENT DOCUMENTS 8,917,191 B1 * 12/2014 Tiana ..................... G08G 5/025
                                                            701/16
10,061,130 B2    8/2018 Gao et al.
(Continued)

FOREIGN PATENT DOCUMENTS

WO    WO-2019012535 A1 *  1/2019 ............. G01B 11/25

OTHER PUBLICATIONS

Bryant Kyler ED—Hemmati Hamid *1954-* [Herausgeberi NJ Identity et al: 11 Foveated optics Proceedings of SPIE; [Proceedings of SPIE ISSN 0277-786X vol. 10524], SPIE, US, vol. 9822, May 16, 2016 (May 16, 2016), pp. 982216-982216, XP060069429, DOI: 10.1117/12.2231328 ISBN: 978-1-5106-1533-5 *abstract* * Sections 2, 3.4, 4.1, 5.3 *.
(Continued)

Primary Examiner — Matthew C Bella
Assistant Examiner — Kathleen M Broughton
(74) Attorney, Agent, or Firm — Suiter Swantz pc llo

(57) ABSTRACT

A system and method. The system may include a display, a lens having distortion, an image generator, and a processor. The lens may be configured to focus light received from an environment. The image generator may be configured to receive the light from the lens and output a stream of images as image data, wherein each of the stream of images is distorted. The processor may be configured to: receive the image data from the image generator; detect a point source object in the stream of images of the image data; enhance the point source object in the stream of images of the image data; undistort the stream of images of the image data having an enhanced point source object; and output a stream of undistorted images as undistorted image data to the display.

19 Claims, 10 Drawing Sheets

(51) Int. Cl.
  *H04N 21/4728*  (2011.01)
  *B64D 45/08*   (2006.01)
  *G06V 10/30*   (2022.01)
  *G06V 30/164*  (2022.01)
  *G02B 27/64*   (2006.01)

(52) U.S. Cl.
  CPC ......... *G06V 30/164* (2022.01); *H04N 5/2259* (2013.01); *H04N 21/4728* (2013.01); *G02B 27/644* (2013.01)

(58) Field of Classification Search
  CPC .............. H04N 21/4728; G02B 27/644; G02B 27/0025
  See application file for complete search history.

(56) References Cited

U.S. PATENT DOCUMENTS

| | | | |
|---|---|---|---|
| 2006/0163446 A1 | 7/2006 | Guyer et al. | |
| 2011/0261153 A1* | 10/2011 | Wein | G02B 26/0875 348/36 |
| 2014/0240820 A1* | 8/2014 | Sitter, Jr. | G01S 3/781 359/399 |
| 2016/0300497 A1* | 10/2016 | He | G08G 5/025 |

OTHER PUBLICATIONS

Extended Search Report for European Application No. 19216299.8 dated Jun. 9, 2020, 12 pages.

\* cited by examiner

POINT SOURCE DETECTION

BACKGROUND

The airline industry has adopted enhanced vision systems (EVSs) (e.g., enhanced flight vision systems (EFVSs)) to be able to see airport approach lights at adequate distance in foggy weather, allowing the airline industry to reduce costly weather-related delays. Additionally, the airport industry is likely to phase out traditional approach lights in favor of light emitting diode (LED) approach lights, which presents a new challenge to detect LED approach lights in foggy weather.

For EVS detection of airport approach lights, the performance limit is typically set by a case of daytime fog. Due to fog attenuation, a point source signal from an approach light may be low, and due to the daytime fog environment, the background may be high. As such, this may result in low contrast information, e.g., a small ratio of signal to background (SB) (and/or contrast), which may be hard to detect by an EVS under system noise.

SUMMARY

In one aspect, embodiments of the inventive concepts disclosed herein are directed to a system. The system may include a display, a lens having distortion, an image generator, and a processor. The lens may be configured to focus light received from an environment. The image generator may be configured to receive the light from the lens and output a stream of images as image data, wherein each of the stream of images is distorted. The processor may be configured to: receive the image data from the image generator; detect a point source object in the stream of images of the image data; enhance the point source object in the stream of images of the image data; undistort the stream of images of the image data having an enhanced point source object; and output a stream of undistorted images as undistorted image data to the display.

In a further aspect, embodiments of the inventive concepts disclosed herein are directed to a vision system. The vision system may include a lens having distortion, an image generator, and a processor. The lens may be configured to focus light received from an environment. The image generator may be configured to receive the light from the lens and output a stream of images as image data, wherein each of the stream of images is distorted. The processor may be configured to: receive the image data from the image generator; detect a point source object in the stream of images of the image data; enhance the point source object in the stream of images of the image data; undistort the stream of images of the image data having an enhanced point source object; and output a stream of undistorted images as undistorted image data to a display.

In a further aspect, embodiments of the inventive concepts disclosed herein are directed to a method. The method may include: focusing, by a lens, light received from an environment, the lens having distortion; receiving, by an image generator, the light from the at least one lens; outputting, by the image generator, a stream of images as image data, wherein each of the stream of images is distorted; receiving the image data from the at least one image generator; detecting a point source object in the stream of images of the image data; enhancing the point source object in the stream of images of the image data; undistorting the stream of images of the image data having an enhanced point source object; and outputting a stream of undistorted images as undistorted image data to a display.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
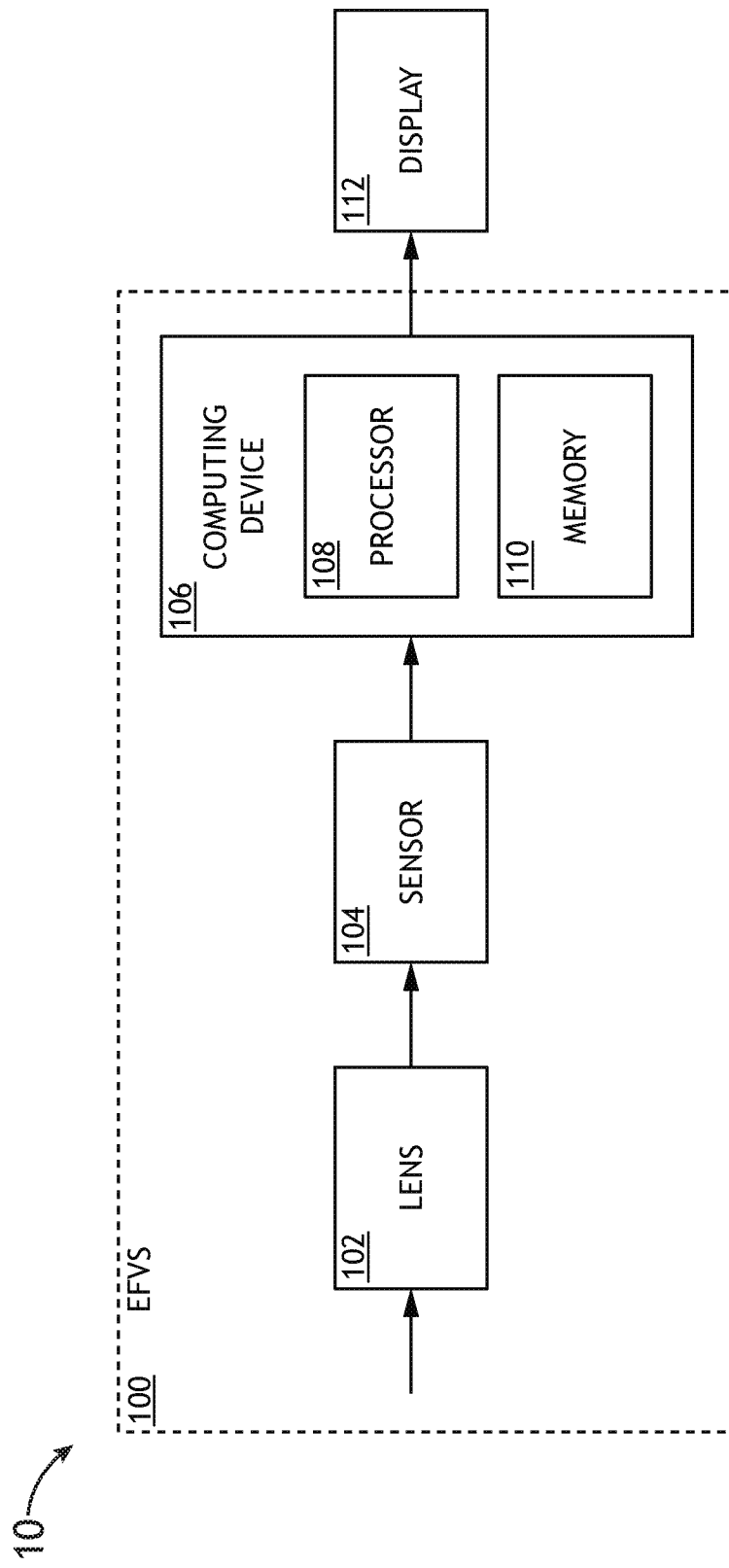
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to utilize a decentered lens and/or a lens with distortion to improve detection of point source objects by increasing a pixel density in a region of interest. In some embodiments, the lens distortion may be used to improve contrast of point source images (which may be otherwise too low to detect under noise) while covering a wide field of view with constrained number of pixels.

Some embodiments include detecting an object (e.g., an approach light) as a point source, which may light up only one pixel. This is often the case in applications where the approach light is far and where a high-performance lens is used to achieve small blur (e.g., caused by aberration and diffraction). Some embodiments may include the use of wavelengths other than visible lights, such as infrared light (e.g., short-wavelength infrared (SWIR), mid-wavelength infrared (MWIR), and/or long-wavelength infrared (LWIR)). For example, FPAs for SWIR, MWIR and LWIR tend to have a relatively small amount of pixels available, i.e. low resolution, and may benefit from the point source detection of some embodiments. In such pixel-number-starved situations, some embodiments effectively increase the resolution in the area where it is mostly needed in order to improve contrast for point source detection.

Some embodiments may improve an SB ratio of an approach light by using a smaller instantaneous field of view (IFOV) because for a point source (e.g., an approach light which may be captured as a single pixel by a sensor), the SB ratio may be approximately proportional (e.g., proportional) to $1/IFOV^2$. IFOV may be the angular projection of a single pixel through a lens, which, to the first order, may be approximately the total number of horizontal pixels divided by the total horizontal field of view (FOV) for square-shaped pixels. For a fixed sensor with a fixed number of available pixels, a small IFOV may mean a smaller total FOV (via longer effective focal length (EFFL)), which may miss a total FOV requirement. On the other hand, increasing the effective number of pixels by using multiple cameras, zoomable lenses, scanning, or a larger focal plane array (FPA) may unnecessarily complicate optomechanics, may increase electrical bandwidth, and may increase size, weight, and power (SWaP).

Some embodiments may utilize a high distortion (e.g., negative distortion and/or barrel/fisheye distortion) lens to improve detection of approach lights in a degraded visual environment (e.g., scattering or obscuring media (e.g., micro-particles causing attenuation and strong background), smoke, smog, and/or fog (e.g., daytime fog)). For example, by fixing the number of pixels and the required FOV, the lens negative distortion may create a smaller IFOV in the central region of the FOV and a larger IFOV in a peripheral region of the FOV. In a typical approach in foggy weather (which is normally not windy in fog), there may be a low probability that all the approach lights will appear in the peripheral FOV. Most likely, the approach lights may appear in the lower central FOV. By an appropriate vertical shift between the lens and the sensor (e.g., a focal plane array (FPA) or a camera), a "sweet spot" of small IFOV region can be optimally located in lower central FOV where the approach lights may appear. Some embodiments (e.g., which may include a distorted and/or decentered lens) may allow for a same total FOV and number of pixels while having smaller IFOV for use as compared to a centered lens with weak or no distortion. Additionally, a larger IFOV in peripheral regions may be adequate for a picture view for a pilot rather than for point source detection of approach lights. Some embodiments may utilize a processor executing software to present an undistorted picture for display to a pilot. Some embodiments, for lens design optimization, may utilize tilting the sensor (e.g., camera or FPA) and/or focus of the sensor, and some embodiments may utilize tilting of selected elements (e.g., a lens) and/or surfaces. Some embodiments may include a decentered lens with distortion, which may include the use of mirror-symmetric free forms. In some embodiments, a high-performance lens may be required so that the aberration smearing of a point source is less than a pixel.

While contrast may be improved by removing a constant background level by a processor executing software, this does not improve a signal to noise ratio (SNR). In the case of point source detection in daytime fog, the noise is often set by the well capacity of the sensors (e.g., FPAs and/or cameras). Short integration time or attenuating filter is often employed to avoid background saturation. Some embodiments may improve the SNR for point source detection in daytime fog by boosting up a weak signal while keeping the same background.

Figure 2B:
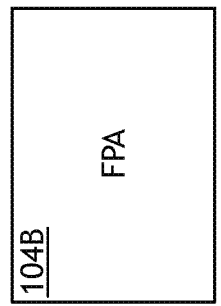
FIG. 2B is a view of an exemplary embodiment of FIG. 1 including a focal plane array (FPA) according to the inventive concepts disclosed herein.
Figure 2A:
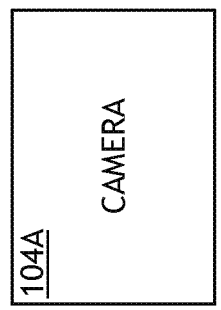
FIG. 2A is a view of an exemplary embodiment of FIG. 1 including a camera according to the inventive concepts disclosed herein.

Referring now to FIGS. 1-2B, an exemplary embodiment of a system according to the inventive concepts disclosed herein is depicted. In some embodiments, the system may include a vehicle (e.g., automobile, a train, a watercraft, a submersible vehicle, or an aircraft 10 (e.g., an airplane or a helicopter)), which may include a vision system (e.g., an EFVS 100, a synthetic visions system (SVS), or a combined vision system (CVS)) and a display 112, some or all of which may be communicatively coupled at a given time. The EFVS 100 may include at least one lens 102, at least one image generator (e.g., at least one sensor 104 (e.g., at least one camera 104A and/or at least one FPA 104B)), and at least one computing device 106, some or all of which may be communicatively coupled at a given time.

In some embodiments, the lens 102 may focus light (e.g., visible light and/or infrared light (e.g., short-wavelength infrared (SWIR), mid-wavelength infrared (MWIR), and/or long-wavelength infrared (LWIR))) received from a degraded visual environment (e.g., an environment of a runway and approach lights at least partially obscured by daytime fog conditions) onto the image generator (e.g., the sensor 104 (e.g., the camera 104A and/or the FPA 104B)). The lens 102 may include one or multiple lens elements. The lens 102 may be any suitable lens, such as a multi-element glass image forming optic or a catadioptric or reflective element image forming optic. In some embodiments, the lens 102 may be a decentered (e.g., off-centered) lens and/or a lens with distortion. For example, the lens 102 may be a decentered lens with high distortion with barrel/fisheye type distortion. In some embodiments, the lens 102 may include tilted elements. The sensor 104 can also be tilted. In some embodiments, the lens 102 may be an axial symmetric lens; however, in other embodiments, the lens 102 may be non-symmetric. Some embodiments use the distortion of the lens to create a denser pixel sampling in the region of interest (where the point sources are located) at the expense of coarse pixel sampling for peripheral area in order to conserve the total number of pixels available from the FPA 104B. The amount of distortion and the distortion's distribution over FOV may be design specific.

The image generator (e.g., the sensor 104 (e.g., the camera 104A and/or the FPA 104B)) may be configured to receive light from the lens 102 and may be configured to output at least one stream of images as image data to the computing device 106, wherein each of the stream of images is distorted. The stream of image data may correspond to captured images of a degraded visual environment (e.g., an environment of a runway and approach lights with daytime fog conditions) of the system. For example, based on the distortion and/or the decenteredness of the lens 102, the image generator may have a field of view (FOV) that may have a first region (e.g., a lower central region of the FOV) of relatively lower instantaneous field of view (IFOV) as compared to a second region (e.g., a peripheral region) of relatively higher IFOV surrounding the first region.

The computing device 106 may include at least one processor 108 and at least one memory 112, some or all of which may be communicatively coupled at any given time. The processor 108 may be communicatively coupled to the image generator (e.g., the sensor 104 (e.g., the camera 104A and/or the FPA 104B) and the at least one display 112 via at least one data bus, such as an avionics data bus, Aeronautical Radio INC. (ARINC) 429, Avionics Full-Duplex Switched Ethernet (AFDX), Ethernet, military standard MIL-STD-1553, and/or Firewire. In some embodiments, the at least one processor 108 may be implemented as at least one general purpose processor, at least one graphics processing unit (GPU), at least one field-programmable gate array (FPGA), and/or at least one application specific integrated circuit (ASIC). The at least one processor 108 may be configured to collectively perform any or all of the operations disclosed throughout.

In some embodiments, the at least one processor 108 may be configured to collectively perform: receive the image data from the at least one image generator; detect at least one point source object in the stream of images of the image data; enhance the at least one point source object in the stream of images of the image data; undistort the stream of images of the image data having at least one enhanced point source object; and/or output a stream of undistorted images as undistorted images to the at least one display.

In some embodiments, each of the at least one point source object in the stream of images may be a single pixel in the stream of images. In some embodiments, the at least one point source object may include at least one approach light.

In some embodiments, the at least one processor 108 being configured to enhance the at least one point source object in the stream of images of the image data further comprises the at least one processor 108 being configured to enhance the at least one point source object in the stream of images of the image data by increasing a size of each of the at least one point source object from a single pixel to multiple pixels. For example, the at least one processor may increase a size of each of the at least one point source object from a single pixel to the single pixel surrounded by adjacent pixels.

In some embodiments, the at least one processor 108 being configured to enhance the at least one point source object in the stream of images of the image data further comprises the at least one processor 108 being configured to enhance the at least one point source object in the stream of images of the image data by changing at least one of a color (e.g., from a whitish or gray color to red, green, blue, yellow, orange, purple, or magenta) or brightness of the at least one point source object.

The at least one display 112 (e.g., at least one head-up display (HUD) and/or at least one head-down display (HDD)) may be configured to receive image data from the at least one processor 108 and to present images to a user (e.g., a pilot). For example, the display may display a stream of undistorted images with enhanced point source objects (e.g., approach lights). In some embodiments, the display 112 may be implemented as a vision system display (e.g., an EFVS, SVS, or CVS display) configured to present visions system images (e.g., EFVS, SVS, or CVS images) to a pilot.

Some embodiments may include multiple lenses 102 and multiple sensors 104 such that with images processed to be displayed on one display 112. Additionally, some embodiments may include multiple sensors 104, each covering a different spectral band and/or different field of view, with images all being sent to the display 112, wherein one, some, or all of the sensors 104 and lenses 102 have distortion allowing smaller IFOV in chosen region of a scene.

Figure 3:
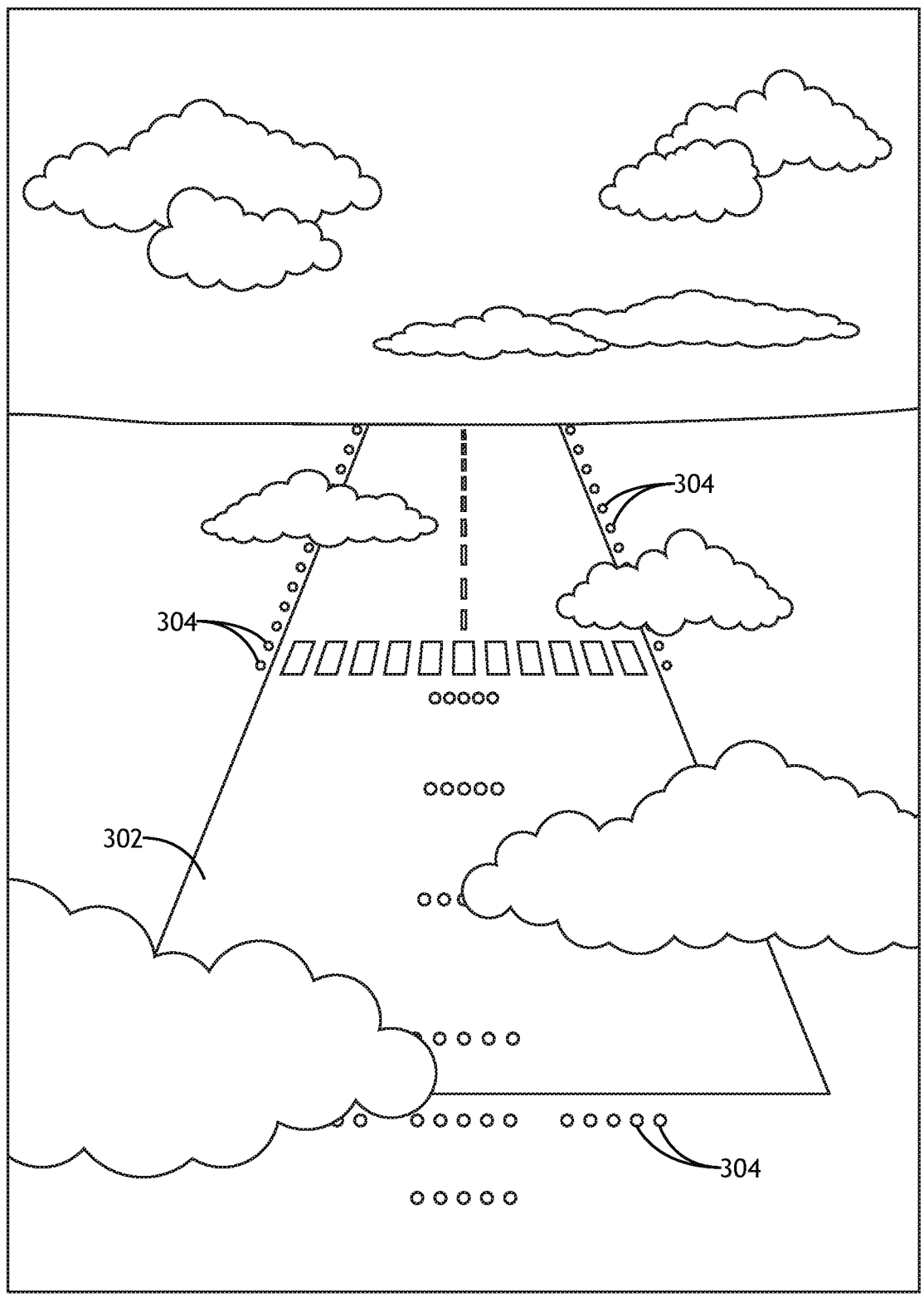
FIG. 3 is an exemplary view of an environment of some embodiments according to the inventive concepts disclosed herein.

Referring now to FIG. 3, an exemplary view of an environment of some embodiments according to the inventive concepts disclosed herein is depicted. The environment may include a runway 302 and approach lights 304 at least partially obscured by daytime fog. In some embodiments, the approach lights 304 may be LED approach lights. In some embodiments, when a raw image of the environment is produced by the image generator (e.g., the sensor 104 (e.g., the camera 104A and/or the FPA 104B)), the approach lights 304 may be represented as point source objects (e.g., a single pixel in size) in a foggy background. If the raw image with point source objects were displayed to a pilot without enhancement, the pilot may be unable to detect the approach lights against the background of the daytime fog.

Figure 4A:
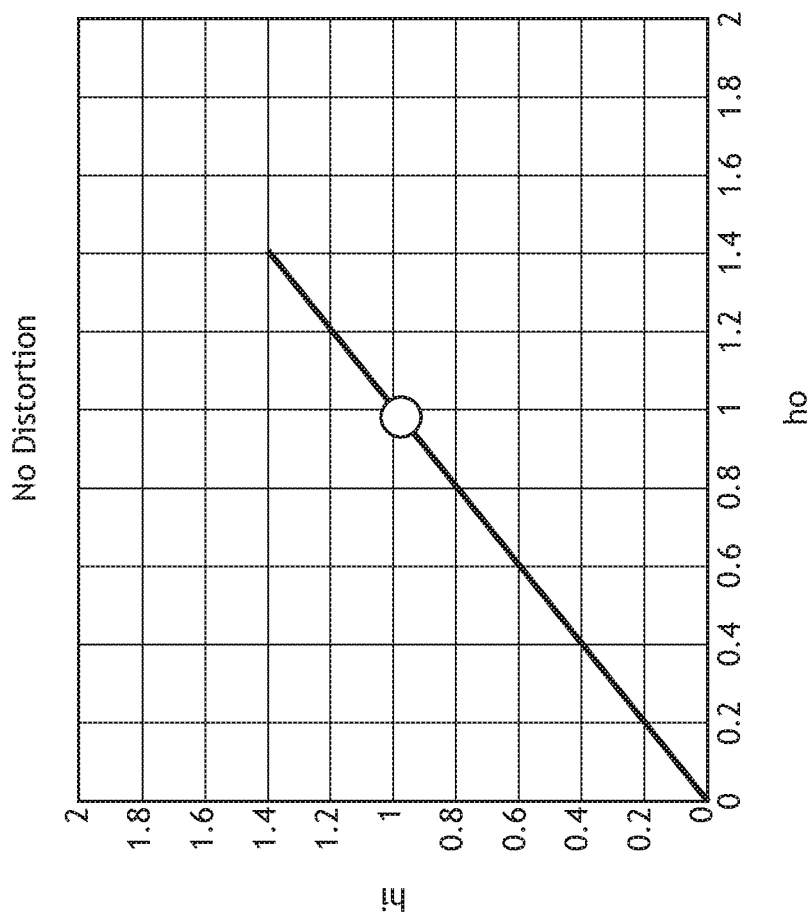
FIG. 4A is an exemplary graph of properties of a lens without distortion according to the inventive concepts disclosed herein.

Referring now to FIG. 4A, an exemplary graph of properties of a lens without distortion is depicted. For example, consider a square-shaped FPA with axial symmetric lens. If a faraway object is at certain angle ANG from axis, the object will be project onto the FPA at certain distance d away from a center of the FPA. For a lens without distortion, d=EFFL*tan(ANG) where EFFL is the effective focal length. The image location variable is described by d and the object location variable by its direction tangent tan(ANG). The relationship between the two variable is linear as shown. To simplify, a normalized variable may be used. hi may be d normalized by the FPA half size dmax, and ho as tan (ANG) normalized by tan(ANGmax) corresponding to the edge for the square-shaped FOV. Normalization does not change the linear relationship, so hi is proportional to ho. In this case, hi=ho because the edge of FOV must map to the edge of FPA, such that hi=1 when ho=1. It should be noted that the curve passes point (1,1), and the curve passes through (1.414, 1.414) since that point may corresponds to the corner of the field.

Figure 4B:
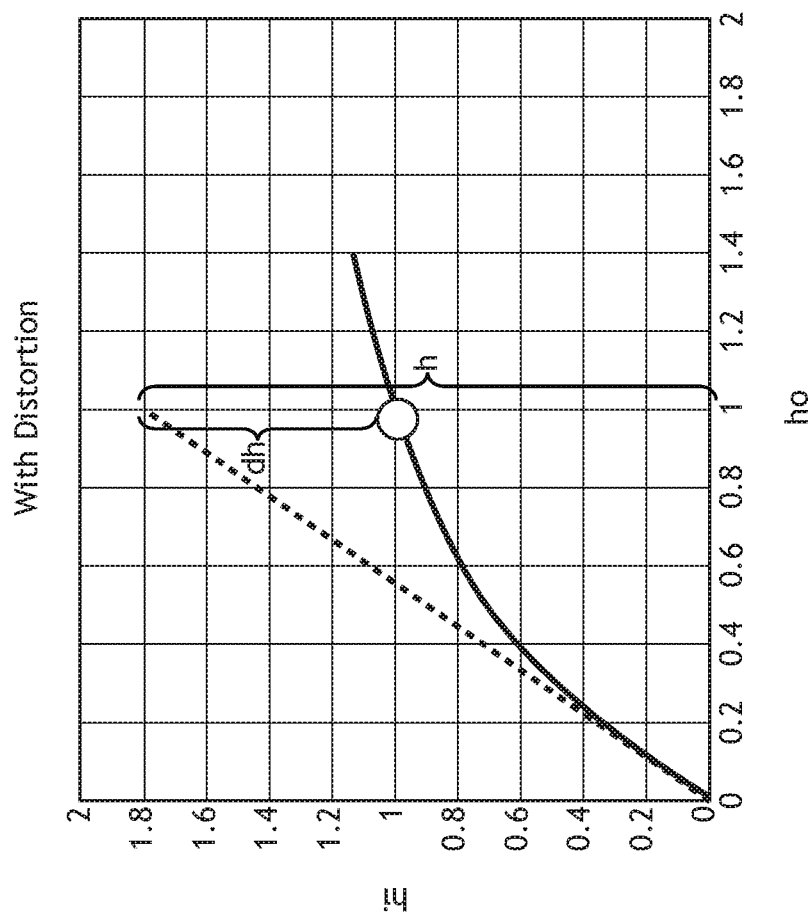
FIG. 4B is an exemplary graph of properties of a centered lens having distortion of some embodiments according to the inventive concepts disclosed herein.

Referring now to FIG. 4B, an exemplary graph of properties of a centered lens having distortion of some embodiments according to the inventive concepts disclosed herein is depicted. The curve is nonlinear, representing distortion. The curve is monotonic and passes (1, 1) so the object at the edge of FOV still get mapped to the edge of FPA. However, the curve becomes more compressed as the field moves away from the center (0,0). The larger slope of the curve indicates higher pixel sampling density and/or smaller IFOV. So, the IFOV gets smaller (with higher pixel density) as the field point moves toward center. The slope is largest at the center and is larger than the slope in FIG. 4A. The slope in FIG. 4B is 1.8× of the slope of FIG. 4A. In some embodiments, the slope may be any suitable slope greater than 1× of the slope of a lens without distortion as shown in FIG. 1A (e.g., greater than 1.1×, greater than 1.3×, greater than 1.5×, greater than 1.9×, etc.). So, IFOV near the center is reduced 1.8× compared to the case of lens without distortion as shown in FIG. 4A. This translates to $(1.8)^2$, which is about 3 times improvement in contrast (as compared to FIG. 4A). In some embodiments, the improvement in contrast compared to a lens without distortion may be any suitable improvement in contrast greater than 1× as compared to a lens without distortion as shown in FIG. 1A (e.g., greater than 1.1×, greater than 1.9×, greater than 2×, greater than 3×, greater than 3.5×, etc.). The larger slope also means bigger EFFL. So, the EFFL for the lens with distortion is 1.8× of the lens without distortion. In some embodiments, the EFFL of the lens with distortion compared to a lens without distortion may be any suitable factor greater than 1× of the EFFL of a lens without distortion as shown in FIG. 1A (e.g., greater than 1.1×, greater than 1.3×, greater than 1.5×, greater than 1.9×, etc.). Comparing the dashed line and the curve, the amount of distortion at the edge can be computed as dh/h, which is −44% in this case. The negative sign indicates barrel type of distortion (e.g., compression type). In some embodiments, the amount of distortion at the edge of the lens with distortion may be any suitable negative amount, such as in the range of between −10% and −70% (e.g., −10%, −20%, −30%, −40%, etc.).

Figure 5A:
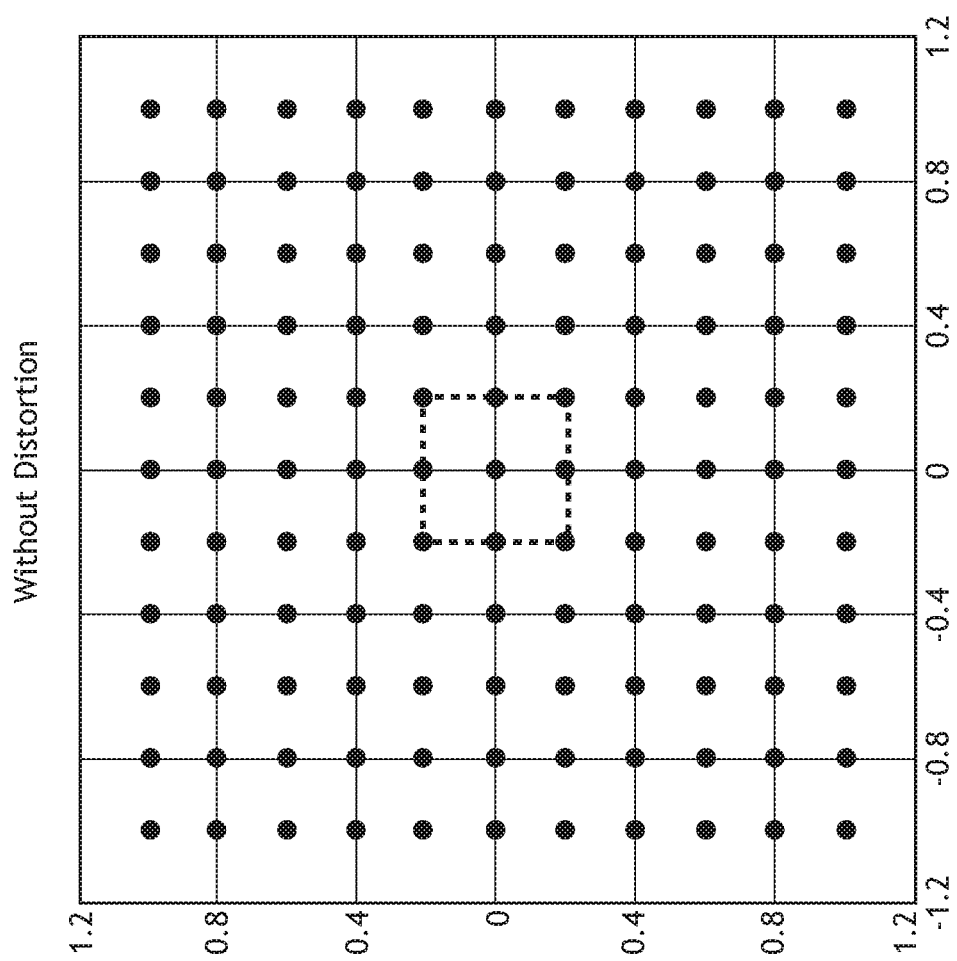
FIG. 5A is an exemplary square grid of points in the field of view (FOV) maps to the FPA for an undistorted centered lens of some embodiments according to the inventive concepts disclosed herein.

Referring now to FIG. 5A, an exemplary square grid of points in the FOV maps to the FPA for an undistorted centered lens of some embodiments according to the inventive concepts disclosed herein is depicted. As shown in FIG. 5A, the dots are uniformly distributed across the grid of the FPA, which represents that IFOV is approximately constant. The IFOV for the region inside the dashed box is approximately the same as the IFOV for the region surrounding the dashed box.

Figure 5B:
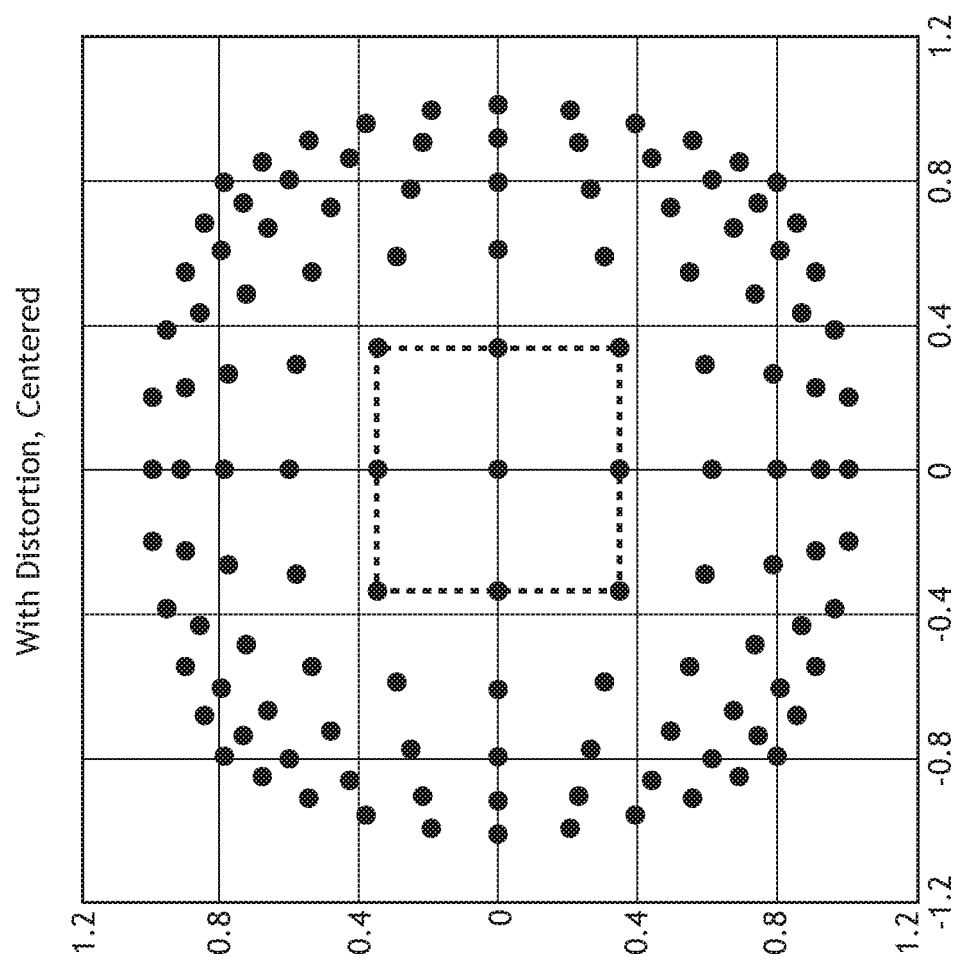
FIG. 5B is an exemplary square grid of points in the FOV maps to the FPA for a distorted centered lens of some embodiments according to the inventive concepts disclosed herein.

Referring now to FIG. 5B, an exemplary square grid of points in the FOV maps to the FPA for a distorted centered lens of some embodiments according to the inventive concepts disclosed herein is depicted. As shown in FIG. 5B, the dots are distributed across the grid of the FPA in barrel/fisheye distortion pattern, which represents that IFOV is smaller toward the center of the FPA than at the edges of the FPA. The IFOV for the region (e.g., a central region) inside the dashed box is less than the IFOV for the peripheral region surrounding the dashed box, and this represents that the pixel density is greater in the central region, which can be used to improve the detection of point source objects (e.g., approach lights) as compared to a lens without distortion.

Figure 5C:
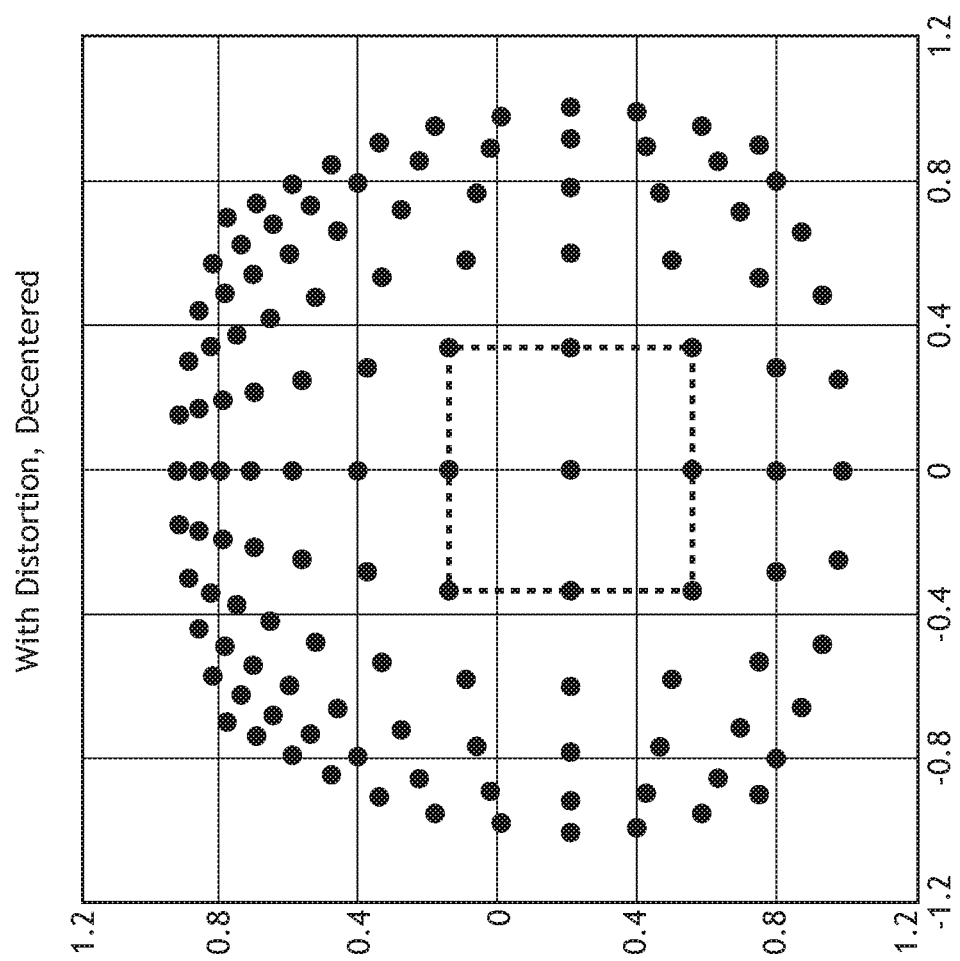
FIG. 5C is an exemplary square grid of points in the FOV maps to the FPA for a distorted decentered lens of some embodiments according to the inventive concepts disclosed herein.

Referring now to FIG. 5C, an exemplary square grid of points in the FOV maps to the FPA for a distorted decentered lens of some embodiments according to the inventive concepts disclosed herein is depicted. As shown in FIG. 5C, the dots are distributed across the grid of the FPA in barrel distortion pattern which is off-centered, which represents that IFOV is smaller toward the lower central region of the FPA than at the edges of the FPA. The IFOV for the region (e.g., a lower central region) inside the dashed box is less than the IFOV for the peripheral region surrounding the dashed box, and this represents that the pixel density is greater in the lower central region, which can be used to improve the detection of point source objects (e.g., approach lights) as compared to a lens without distortion.

Figure 6:
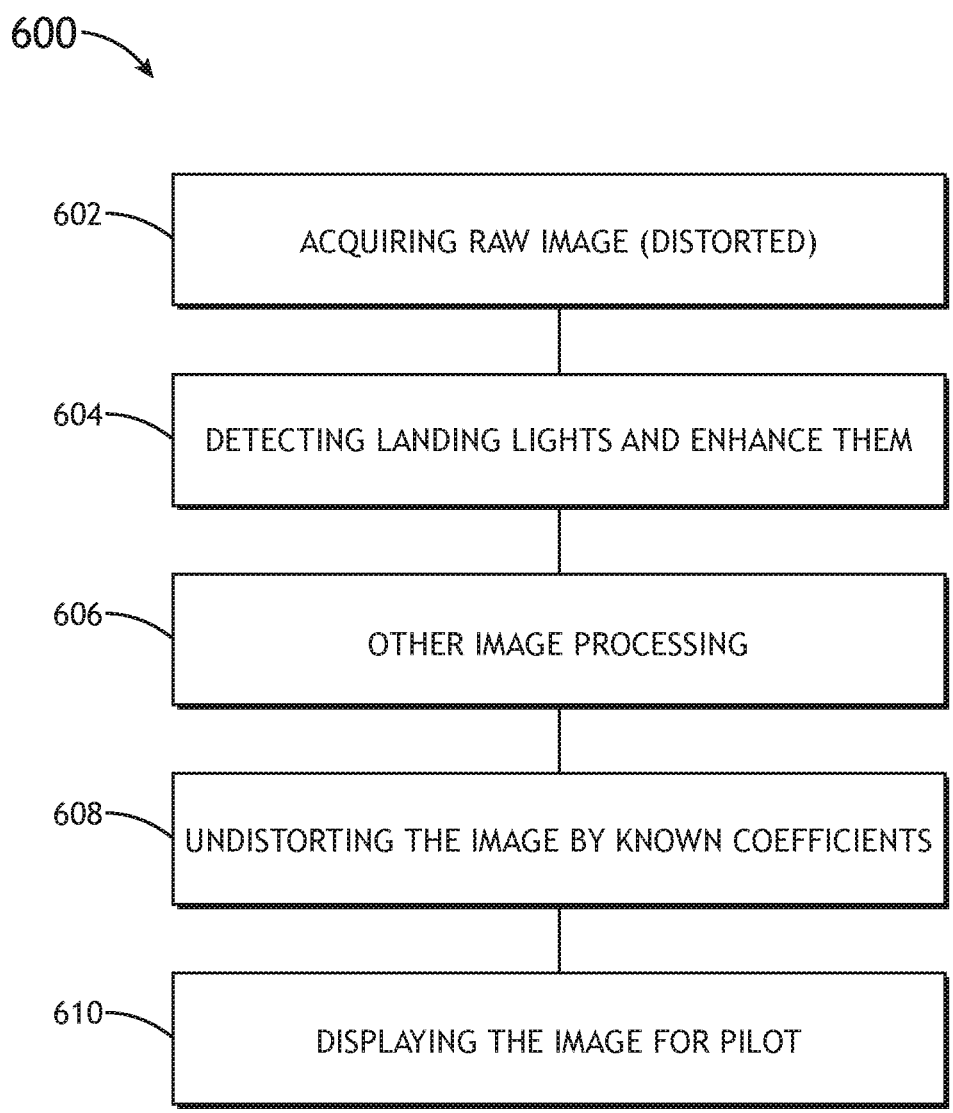
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially. For example, the steps may be performed by the at least one processor 108.

A step 602 may include acquiring a raw image (e.g. a raw distorted image) from an image generator (e.g., sensor 104).

A step 604 may include detecting point source objects (e.g., approach lights) and enhancing the point source objects.

A step 606 may include performing other image processing operations.

A step 608 may include undistorting the image by known coefficients, for example, to remove barrel distortion. The coefficients may be coefficients in a multivariate polynomial distortion correction equation. In general, a distortion map may be a function mapping back and forth between two-dimensional pixel coordinates of undistorted and distorted images. This map can be represented many ways algorithmically with adequate accuracy, for example, by certain types of formulas, or by some interpolated look-up table. Depending on specific application, this map can be known by design or can be measured in production.

A step 610 may include displaying the undistorted and enhanced image to a pilot.

Further, the method 600 may include any of the operations disclosed throughout.

Figure 7A:
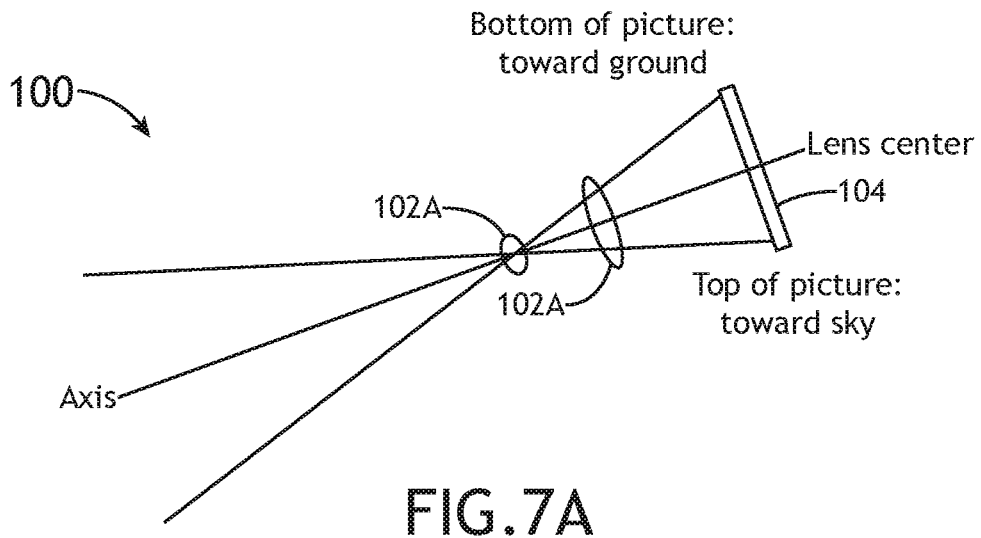
FIG. 7A is a view of an exemplary embodiment of the EFVS of FIG. 1 according to the inventive concepts disclosed herein.
Figure 7B:
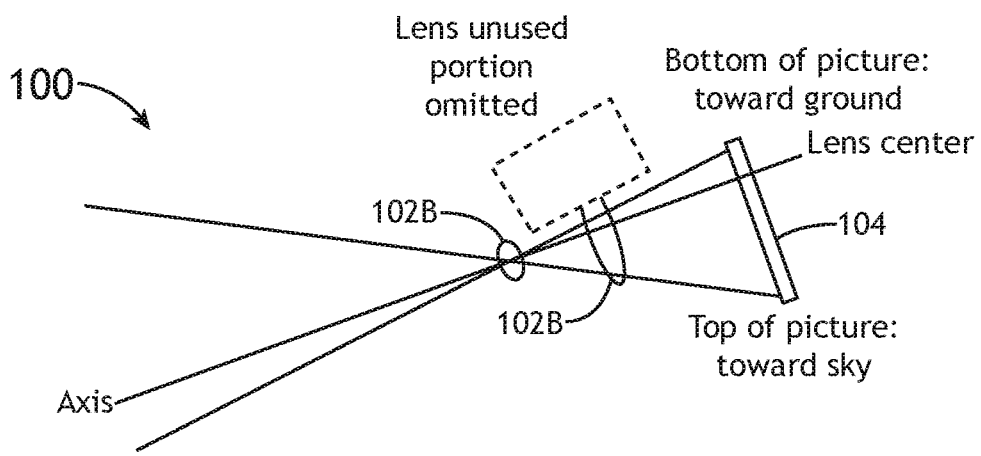
FIG. 7B is a view of an exemplary embodiment of the EFVS of FIG. 1 according to the inventive concepts disclosed herein.
Figure 7C:
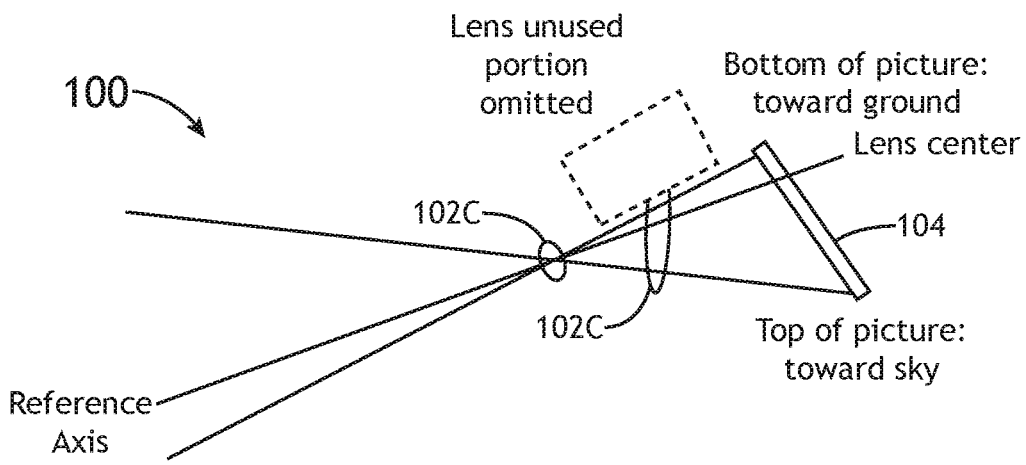
FIG. 7C is a view of an exemplary embodiment of the EFVS of FIG. 1 according to the inventive concepts disclosed herein.

Referring now to FIGS. 7A-7C, exemplary embodiments of the EFVS 100 according to the inventive concepts disclosed herein are depicted. The EFVS 100 may include a lens (e.g., 102A, 102B, or 102C) and a sensor 104. The lens (e.g., 102A, 102B, or 102C) may be positioned between the environment—to be captured by the sensor 104, and the sensor 104. As shown in FIG. 7A, the lens 102A may be a centered lens with distortion positioned with an optical axis of the lens orthogonal to the image capturing surface of the sensor 104. As shown in FIG. 7B, the lens 102B may be a decentered lens with distortion positioned with an optical axis of the lens orthogonal to the image capturing surface of the sensor 104. Any unused portion of the lens 102B may be omitted (e.g., chopped off) to reduce size and weight. As shown in FIG. 7C, the lens 102C may be a decentered lens with distortion (with tilted element(s)) positioned with a reference axis of the lens non-orthogonal (e.g., tilted) to the image capturing surface of the sensor 104. Any unused portion of the lens 102C may be omitted to reduce size and weight.

As will be appreciated from the above, embodiments of the inventive concepts disclosed herein may be directed to system and a method configured to utilize a decentered lens and/or a lens with distortion to improve detection of point source objects by increasing a pixel density in a region of interest.

As used throughout and as would be appreciated by those skilled in the art, "at least one non-transitory computer-readable medium" may refer to as at least one non-transitory computer-readable medium (e.g., memory 110; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   at least one display;
   at least one lens, the at least one lens including a lens having distortion, the at least one lens configured to focus light received from an environment;
   at least one image generator configured to receive the light from the at least one lens and output a stream of images as image data, wherein each of the stream of images is distorted; and
   at least one processor configured to:
      receive the image data from the at least one image generator;
      detect at least one point source object in the stream of images of the image data;
      enhance the at least one point source object in the stream of images of the image data;
      undistort the stream of images of the image data having at least one enhanced point source object; and
      output a stream of undistorted images as undistorted image data to the at least one display,
   wherein the distortion is barrel type distortion, wherein a field of view (FOV) of the at least one image generator has a first region of relatively lower instantaneous field of view (IFOV) as compared to a second region of relatively higher IFOV,
   wherein the lens is decentered, wherein the first region is a lower central region of the FOV.

2. The system of claim 1, wherein each of the at least one point source object in the in the stream of images is a single pixel in the stream of images.

3. The system of claim 2, wherein the environment includes a runway and approach lights at least partially obscured by daytime fog, wherein the at least one point source object includes at least one approach light.

4. The system of claim 3, wherein the at least one display, the at least one lens, the at least one image generator, and the at least one processor are implemented in an aircraft.

5. The system of claim 1, wherein the at least one image generator comprises a focal plane array (FPA).

6. The system of claim 1, wherein the at least one image generator comprises a camera.

7. The system of claim 1, wherein the light comprises visible light.

8. The system of claim 1, wherein the at least one processor being configured to enhance the at least one point source object in the stream of images of the image data by increasing a size of each of the at least one point source object from a single pixel to multiple pixels.

9. The system of claim 1, wherein the at least one processor being configured to enhance the at least one point source object in the stream of images of the image data by changing at least one of a color or brightness of the at least one point source object.

10. The system of claim 1, wherein the at least one display comprises a head-up display (HUD) installed in an aircraft.

11. The system of claim 1, wherein the at least one display comprises a head-down display (HDD) installed in an aircraft.

12. The system of claim 1, further comprising a vision system at least comprising the at least one lens, the at least one image generator, and the at least one processor.

13. The system of claim 12, wherein the vision system is an enhanced flight vision system (EFVS) installed in an aircraft.

14. The system of claim 1, wherein the at least one lens is tilted relative to a surface of the at least one image generator.

15. The system of claim 1, wherein the light comprises infrared light.

16. A vision system, comprising:
at least one lens, the at least one lens including a lens having distortion, the at least one lens configured to focus light received from an environment;
at least one image generator configured to receive the light from the at least one lens and output a stream of images as image data, wherein each of the stream of images is distorted; and
at least one processor configured to:
receive the image data from the at least one image generator;
detect at least one point source object in the stream of images of the image data;
enhance the at least one point source object in the stream of images of the image data;
undistort the stream of images of the image data having at least one enhanced point source object; and
output a stream of undistorted images as undistorted image data to at least one display,
wherein the distortion is barrel type distortion, wherein a field of view (FOV) of the at least one image generator has a first region of relatively lower instantaneous field of view (IFOV) as compared to a second region of relatively higher IFOV,
wherein the lens is decentered, wherein the first region is a lower central region of the FOV.

17. The system of claim 16, wherein the vision system is an enhanced flight vision system (EFVS) installed in an aircraft.

18. The system of claim 16, wherein each of the at least one point source object in the in the stream of images is a single pixel in the stream of images, wherein the environment includes a runway and approach lights at least partially obscured by daytime fog, wherein the at least one point source object includes at least one approach light.

19. A method, comprising:
focusing, by at least one lens, light received from an environment, the at least one lens including a lens having distortion;
receiving, by at least one image generator, the light from the at least one lens;
outputting, by the at least one image generator, a stream of images as image data, wherein each of the stream of images is distorted;
receiving the image data from the at least one image generator;
detecting at least one point source object in the stream of images of the image data;
enhancing the at least one point source object in the stream of images of the image data;
undistorting the stream of images of the image data having at least one enhanced point source object; and
outputting a stream of undistorted images as undistorted image data to at least one display,
wherein the distortion is barrel type distortion, wherein a field of view (FOV) of the at least one image generator has a first region of relatively lower instantaneous field of view (IFOV) as compared to a second region of relatively higher IFOV,
wherein the lens is decentered, wherein the first region is a lower central region of the FOV.

* * * * *